PHOTOSENSITIVE SYSTEMS FOR HANDLING INFORMATION

Filed March 18, 1963 2 Sheets-Sheet 1

INVENTOR.
H. C. SIBLEY
BY Forest B Hitchcock
HIS ATTORNEY

PHOTOSENSITIVE SYSTEMS FOR HANDLING INFORMATION

Filed March 18, 1963 2 Sheets-Sheet 2

INVENTOR.
H.C. SIBLEY
BY
Forest B. Hitchcock
HIS ATTORNEY

United States Patent Office 3,399,305

Patented Aug. 27, 1968

3,399,305

PHOTOSENSITIVE SYSTEMS FOR HANDLING INFORMATION

Henry C. Sibley, Spencerport, N.Y., assignor to General Signal Corporation, Rochester, N.Y., a corporation of New York Filed Mar. 18, 1963, Ser. No. 265,920
22 Claims. (Cl. 250—209)

This invention relates to a method and systems for handling information, and, more particularly, pertains to such a method and systems for handling information in which the input information to be handled may be electrical or visual in form and from which an electrical or visual output may be obtained.

In present day information handling systems, practical usage is made of electronic elements such as transistors, tubes, and electro-mechanical elements such as relays arranged in the functional forms of shift registers, counters, logic circuits, storage units, and the like to handle input information of an electrical form to provide an output also of electrical form. Such information handling systems using the elements mentioned above thus must of necessity be limited to applications in which input information in electrical form only is available.

A recent attempt to provide more versatile information handling systems has involved the use of so called photoconductor elements and electro-luminescent cells connected in different combinations. In general, the photoconductor element characteristically has a substantially high resistance in the order of megohms which is reducible to a few hundreds of ohms when such photoconductor element is exposed to suitable light energy. Moreover, an electro-luminescent cell exhibits the phenomenon known as electro-luminescence when the phosphor material comprising the cell emits visible, or near visible light radiations when the element is subjected to electrical fields such as alternating electrical fields of certain magnitude and frequency. However, the combination of photoconductor elements and electro-luminescent cells into different combinations has not met with success principally due to the fabrication problems encountered. That is, and generally speaking, the phosphor materials are deposited in layers and arranged in combination with filters and the photoconductor elements. Because electroluminescent cells have the characteristic that requires continuous energization of a given cell in order to effect transfer of information to a succeeding stage, not only must the continuous source of energy be provided, but at least one additional element and cell must be employed for each stage of a given information handling system. Moreover, proper functioning of phosphor material layer depositing in layers relative to photoconductor elements requires close spacing, thus prohibiting any remote readout of a given functional combination of such elements and cells.

Described briefly, the present invention employs photoconductor cells and incandenscent lamps arranged in different functional combinations to handle input information in the form of an electrical or visual input so as to provide an output in either electrical or visual form. In the combinations of the present invention to be described, use is made of the characteristic attributed to incandescent lamps, i.e., the delay in decay of the light energy emitted from a given incandescent lamp after removal of controlling energy.

The small size of photoconductor elements and incandescent lamps employed in the embodiments of the present invention provides for ease of fabrication for functional information handling systems in the form of shift registers, counters, etc. and yet provides easy adaptation to existing systems. Moreover, an information handling system comprised of photoconductor elements and incandesecnt lamps is exceedingly economical compared to systems using transistors, tubes, electro-luminescent cells, etc., while still providing the versatility of electrical or visual input and electrical or visual output of the systems as desired.

It is additionally contemplated in the present invention to have successively positioned stages of storage elements each comprising at least a photoconductor element and an incandescent lamp arranged in the form of a counter etc. to transfer a condition of storage between successive stages by the method of alternately applying in spaced time intervals control energy pulses of suitable duration to the control terminals of successive stages where light energy emitted from an incandescent lamp then having its control energy removed is effective to control a succeeding stage for energization. Alternately, a method of lengthening the time interval between alternately applied control energy pulses to successive stages and yet utilizing the decay time characteristic of an incandescent lamp employs a capacitor stage for controlling the incandescent lamp of the first stage after removal of the controlling energy therefrom.

Thus, one object of this invention is to provide an information handling system wherein the input information may be either electrical or visual in form and the output information may be either electrical or visual in form.

Another object of this invention is to provide an information handling system including a photoconductor element and an incandescent lamp connected in combination in the form of a storage unit.

Another object of this invention is to provide an information handling system including a plurality of serially connected stages with each stage comprising at least a photoconductor element and an incandescent lamp and adapted to given functions.

Another object of this invention is to provide an information handling system including a plurality of storage stages where each stage may be located remotely from adjacently positioned stages.

Another object of this invention is to provide an information handling system which is economical, easy to manufacture, and readily adapted to given functions.

Another object of this invention is to disclose a method whereby information may be transferred between successively positioned storage stages each comprised of at least a photoconductor element and an incandescent lamp where controlling energy is removed from the incandescent lamp of the transferring stage during transfer.

Other objects, purposes and characteristic features of this invention will be in part obvious from the accompanying drawings and in part pointed out as the description of the invention progresses.

In describing the invention in detail, reference will be made to the accompanying drawings, in which like reference characters designate corresponding parts throughout the several views, and in which.

For the purpose of simplifying the illustrations and facilitating in the explanation, the various parts and circuits constituting the different embodiments of the invention have been shown diagrammatically and certain conventional illustrations have been employed, the drawings having been made more with the purpose of making it easy to understand the principles and mode of operation than with the idea of illustrating specific constructions and arrangements of parts that would be employed in practice. Thus, the relays and their contacts are illustrated in a conventional manner, and the symbols (+) and (−) are employed to indicate the positive and negative terminals, respectively, of suitable batteries, or other sources of direct current, instead of showing all of the wiring connections to these terminals.

In the diagrammatic illustrations of FIGS. 1–9, it is required that the photoconductor elements and incandescent lamps be suitably matched with respect to their respective spectral characteristics for sensitivity and emission. One such suitably matched combination that has worked well in practice includes a photoconductor element referred to as LDR–04 supplied from Ferroxcube Corporation of America located at Saugerties, N.Y., and an incandescent lamp identified as No. 1764 supplied from the Hudson Lamp Company located at Kearney, N.J. It should be understood, however, that other combinations of suitable photoconductor elements and incandescent lamps may be employed in carrying out the principles of the present invention.

Figures 1, 2, 3:
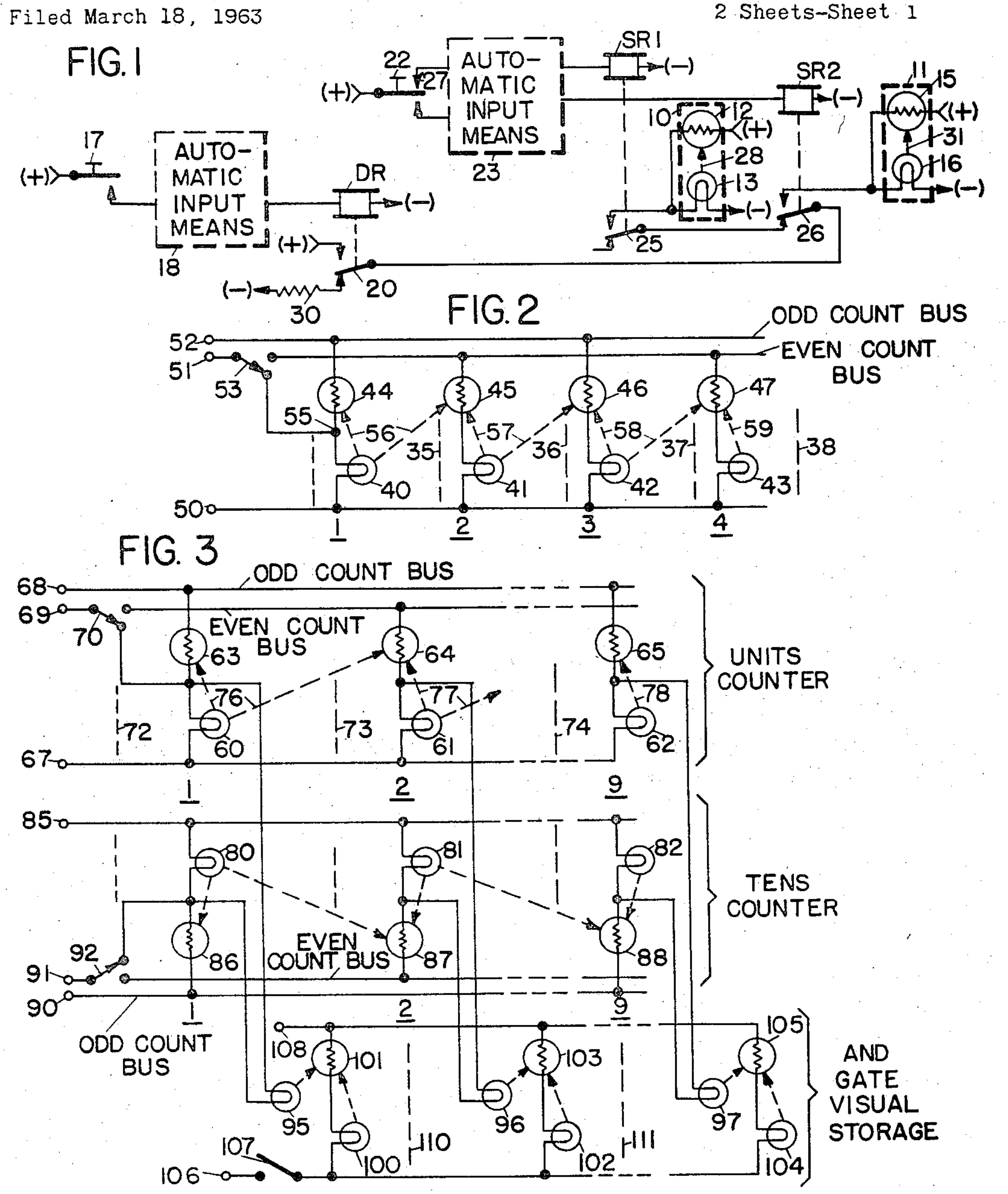
FIG. 1 is a schematic circuit diagram showing separate storage units and the control therefor as a first embodiment of this invention.
FIG. 2 is a schematic circuit diagram showing a counter embodying this invention.
FIG. 3 is a schematic circuit diagram showing an AND gate storage circuit embodying this invention.

Referring now to FIG. 1, two storage units 10 and 11 are shown each comprising a photoconductor element and an incandescent lamp. Storage unit 10 includes element 12 and lamp 13, while storage unit 11 includes element 15 and lamp 16. A detector relay DR is controlled by a manually operable button 17 or by an automatic input means 18 to supply (+) or (−) energy through its contact 20 to either storage unit 10 or storage unit 11. Selection of the storage units 10 and 11 is effected according to the operation of stepping relay SR1 associated with storage unit 10 and stepping relay SR2 associated with storage unit 11. The relays SR1 and SR2 may be controlled in a sequence by a manually operable button 22 or a suitable automatic input means 23 so that connection of the (+) or (−) control energy is completed to the respective storage unit 10 or storage unit 11 through contacts 25 and 26 of relays SR1 and SR2, respectively.

In operation, detector relay DR is first energized upon actuation of button 17 to cause its front contact 20 to close. When button 22 makes contact with point 27, relay SR1 is energized and causes front contact 25 thereof to close. A circuit is then completed for energizing lamp 13 of storage unit 10 which extends from (+), through front contact 20 of relay DR, through back contact 26 of relay SR2, through front contact 25 of relay SR1, through the filament of lamp 13, to (−). Upon energization of lamp 13, light energy emitted therefrom in the direction of dotted arrow 28 irradiates element 12 which causes its resistance to be reduced to a small value. Upon release of relays DR and SR1, the condition of storage as indicated by the energization of lamp 13 is maintained. This stored condition remains until relay SR1 is again energized, while relays SR2 and DR remain deenergized. A release circuit is then completed for shunting lamp 13 through the contacts 25, 26 and 20 of relays SR1, SR2 and DR, respectively, through a resistor 30, to (−). Upon deenergization of lamp 13, the resistance of element 12 again assumes a substantially high value.

Storage unit 11 is controlled upon energization of relay SR2 and according to the condition of relay DR. When relay DR is energized, the circuit for lamp 16 is completed through front contact 26 of relay SR2 and front contact 20 of relay DR to cause energization thereof. While energized, light energy emitted from lamp 16 irradiates element 15 as indicated by dotted arrow 31 so as to maintain the resistance of element 15 at a low value. Energization of lamp 16 is sustained during the subsequent deenergized condition of relay SR2 through element 15. Assuming relay DR is then deenergized and relay SR2 is energized, (−) is supplied to storage unit 11 which shunts lamp 16 to cause deenergization thereof, thereby removing the stored condition.

Referring now to FIG. 2, a plurality of storage units each comprising a photoconductor element and an incandescent lamp are arranged in successive stages to form a counter. More particularly, the plurality of storage units comprise counting stages 1, 2, 3 and 4 of a counter. Each of the illustrated stages includes means for optically coupling the light energy emitted from the incandescent lamp of a given stage of the photoconductor element of that stage and the next successive stage. Such optical coupling means is indicated by the vertically positioned dotted lines 34, 35, 36, 37, and 38 and may be made from a suitable light energy shielding material which is opaque such as metal.

The counting stages 1, 2, 3 and 4 include, respectively, incandescent lamps 40, 41, 42 and 43 and photoconductive elements 44, 45, 46 and 47. It is noted that each of the lamps 40–43, when energized, irradiates the photoconductive element for its stage and the photoconductive element for the succeeding stage as limited by respective optical coupling means 34–38. For example, lamp 41, when energized, irradiates photoconductive elements 45 and 46 for stage 2 and 3 respectively as limited by optical coupling means 35 and 36. In this connection, the incandescent lamp for a given stage is employed to provide a visual indication as well as act as a transfer element for transferring a count of the succeeding stage in response to an input counting pulse. Thus, the adjacent counting stages must of necessity be located in close proximity or locally so that a given lamp may irradiate its associated photoconductive elements.

In operation, terminal 50 may be connected to a steady negative (−) energy while terminals 51 and 52 may be connected alternately to a positive (+) energy which may be in the form of sequentially applied counting pulses. Those skilled in the art will appreicate that this can be accomplished in a variety of ways. For example, terminals 51 and 52 may be connected to alternate sides of a multivibrator, both of which are referenced to positive energy, or to a Form C Microswitch, as mnaufactured by the Micro Switch Company of Freeport, Ill., for mechanical operation. Initially, to operate counting stage 1, a switch 53 applies a first input counting pulse appearing at terminal 51 to a common point of connection 55 between lamp 40 and element 44 which causes lamp 40 to energize. During the energization of lamp 40, elements 44 and 45 are irradiated with light energy as indicated by dotted arrows 56. Alternately, photoconductor element 44 may receive input radiation light energy, such as from a flashlight, lamp or other such device, which lowers the resistance thereof so that a circuit is established for energizing lamp 40 in response to a positive (+) counting pulse applied to terminal 52 and the ODD COUNT BUS. In any event, lamp 40 is maintained energized in response to a first count pulse applied to terminal 52 for the duration thereof.

Transfer of a count storage between counting stages 1 and 2 is effected when the next counting pulse is applied to terminal 51 and the EVEN COUNT BUS, assuming switch 53 is changed to position to connect the EVEN COUNT BUS to terminal 51. The photoconductor element 45, being irradiated, is in its low resistance condition which permits a circuit to be completed for energizing lamp 41 of counting stage 2. Lamp 41 thus remains energized to irradiate lamps 45 and 46 as indicated by dotted lines 57 as long as the EVEN COUNT BUS is energized by the applied counting pulse. A next counting pulse applied to terminal 52 causes lamp 42 for counting stage 3 to be energized inasmuch as photoconductor element 46 is in its low resistance condition. Lamp 42, when energized, irradiates photoconductor elements 46 and 47 as indicated by dotted arrows 58. A succeeding counting pulse applied to terminal 51 and to the EVEN COUNT BUS causes lamp 43 to be energized inasmuch as photoconductor element 47 is in its low resistance condition. For successively received counting pulses applied to terminals 51 and 52, successive counting stages (not shown) are controlled in sequence to indicate the number of counting pulses received at the terminals 51 and 52.

In the operation of the counter shown in FIG. 2, the circuit 53 may be employed to operate such connector to a zero count position. To accomplish this operation, it is necessary that circuit 53 be connected so as to connect pulsed energy applied to terminal 51 to the common connection point 55 thereby shunting the photoconductor element 44. To remove any existing count from the counter of FIG. 2, it is necessary to initially remove the sources of energy respectively applied to the terminals 51 and 52 so that the given photoconductor element then in its low resistance condition can again assume a substantially high resistance condition in the absence of received light energy from an associated incandescent lamp.

The input counting pulses applied to terminals 51 and 52 may appear in immediate succession, i.e., a counting pulse applied to one terminal may be initiated concurrently with the conclusion of the counting pulse being applied to the opposite input terminal. Alternately, a limited time interval may intervene between the conclusion of one counting pulse and the initiation of a succeeding counting pulse applied to respective terminals 51 and 52. In this connection, the characteristic delay in decay of energization for each of the incandescent lamps 40–43 includes light energy emitted therefrom sufficient to irradiate indicated photoconductor elements for the limited time interval, and this irradiation by a given incandescent lamp may be effective for a time interval in the order of several milliseconds.

In FIG. 3, photoconductor elements and incandescent lamps are arranged in combinations in the form of a units counter and a tens counter which together operate with an AND gate visual storage also comprised of photoconductor elements and incandescent lamps. In this connection, for description purposes only three stages of counting are shown for each of the units counter and tens counter which represent counting stages 1, 2 and 9, while counting stages 3–8 are not shown but would be normally included.

The units counter includes incandescent lamps 60, 61 and 62 for respective counting stages 1, 2 and 9 as well as respective photoconductor elements 63, 64 and 65. One terminal of each of the lamps 60, 61 and 62 is connected to a terminal 67. One terminal of each of the elements 63 and 65 is connected to an ODD COUNT BUS which is connected to an input terminal 68. One terminal of element 64 is connected to an EVEN COUNT BUS and to input terminal 69 through switch 70. Light energy emitted from respective lamps 60, 61 and 62 are directed to associated photoconductor elements by positioned optical coupling means indicated by vertically positioned dotted lines 72, 73 and 74 as suggested by dotted arrows 76, 77 and 78, respectively.

The ten counter includes lamps 80, 81 and 82 for respective counting stages 1, 2 and 9. One terminal of each of the lamps 80–82 is connected to an input terminal 85. One terminal of elements 86 and 88 for respective counting stages 1 and 9 are connected to input terminal 90 and the ODD COUNT BUS, while one terminal of element 87 is connected to an input terminal 91 through a switch 92 and the EVEN COUNT BUS.

An incandescent lamp is connected between the common point of connection for the lamp and photoconductor element for corresponding stages which serves as a readout and forms a portion of the AND gate visual storage. More particularly, lamps 95, 96 and 97 are electrically connected to the corresponding count stages 1, 2 and 9 of the units counter and tens counter. The AND gate visual storage further includes a photoconductor element and an incandescent lamp associated with each of the lamps 95, 96 and 97. More particularly, lamp 100 and element 101 are associated with lamp 95, lamp 102 and element 103 are associated with lamp 96, and lamp 104 and element 105 are associated with lamp 97. One terminal of each of the lamps 100, 102 and 104 is connected to an input terminal 106 through a switch 107. One terminal of each of the elements 101, 103 and 105 is connected to an input terminal 108.

In operation, the units counter and tens counter may be operated individually or in combination to the extent that it is desired to indicate and store a condition of correspondence between similarly positioned counting stages. In each case, a steady negative (−) energy and a steady positive (+) energy are applied, respectively, to terminals 67 and 85 of the units counter and tens counter respectively. For the units counter specifically, counting pulses (positive in character) applied to the ODD COUNT BUS and to the EVEN COUNT BUS terminals 68 and 69 respectively operate the counting stages illustrated in the manner described for the counter of FIG. 2. For the tens counter specifically, the counting stages thereof are operated in response to counting pulses (negative in character) applied to the ODD COUNT BUS and EVEN COUNT BUS at terminals 90 and 91 respectively similarly to that described for the counter of FIG. 2.

In each instance where correspondence is had between the illustrated counting stages 1, 2 and 9 of the units counter and tens counter, the associated lamp 95, 96 and 97 is energized. For example, assuming that the counting stage 2 for each of the units counter and tens counter is energized, the respective photoconductor elements 64 and 87 for the units counter and tens counter are in their low resistance conditions. A circuit is then completed for lamp 96 which includes terminal 69, the EVEN COUNT BUS for the units counter, photoconductor element 64, lamp 96, photoconductor element 87 and terminal 91. Lamp 96 being energized irradiates photoconductor element 103 in the AND gate visual storage causing it to be operated to a low resistance condition for completing a circuit for energizing lamp 102. With switch 107 being connected, opposite sources of energy are applied to terminals 106 and 108. Lamp 102 is energized as current flows through photoconductor element 103 and the filament of lamp 102. While the switch 107 is connected and the opposite sources of energy are applied to terminals 106 and 108, the visual storage provided by lamp 102 is maintained even though either the units counter or tens counter or both is operated to a different counting position causing the counting stage 2 to be deenergized.

Figure 4:
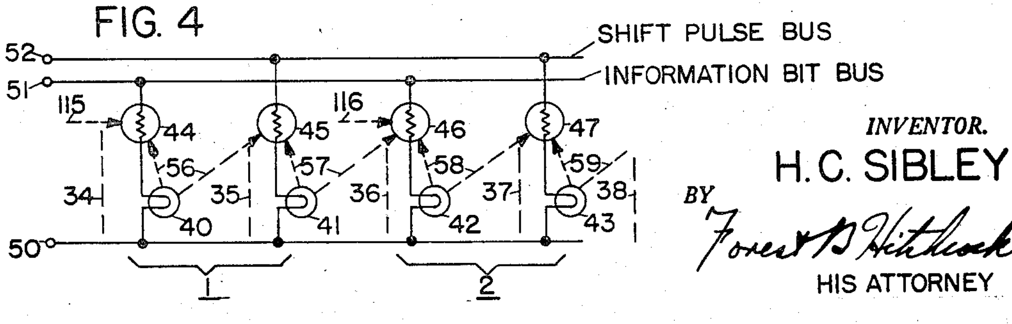
FIG. 4 is a schematic circuit diagram showing a shift register embodying this invention.

In FIG. 4, the counter stages 1–4 of the counter shown in FIG. 2 are utilized in combination to form a shift register where the counting stages 1 and 2 are utilized in combination as a shift register stage 1 and the counting stages 3 and 4 are utilized as a second shift register stage 2. The terminal 50 is connected to a terminal of respective lamps 40–43, while terminal 51 is connected to a terminal of photoconductor elements 44 and 46 over an INFORMATION BIT BUS. A terminal of photoconductor elements 44 and 46 are employed for bit storage, while the evenly positioned stages including elements 45 and 47 are employed herein for transfer.

Bits of information may be supplied to the shift register stages 1 and 2 in the form of light energy as suggested by dotted arrows 115 and 116 irradiating, respectively, photoconductor elements 44 and 46, and such bits of information may take the well known form of either a digital input or a binary input. In operation, one source of energy is supplied to terminal 50, while a first train of bit pulses is supplied to terminal 51, and a second train of shift pulses alternate in time sequence to the first train is applied to terminal 52, all by suitable input means. In response thereto, bit information stored in one or more storage stages will be shifted to succeeding storage stages of respective succeeding shift register stages. For example, if it is assumed that element 44 is in its low resistance condition to cause lamp 42 to be energized and store an information bit, such bit may be shifted to shift register stage 2 in response to a shift pulse applied to terminal 52. More particularly, photoconductor element 45 being in its low resistance condition in response to received radiation from lamp 40 permits lamp 41 to be energized. Lamp 41 irradiates photoconductor element 46 of shift register stage 2 as indicated by dotted arrows 57. With opposite energies applied to terminals 50 and 51, lamp 42 is energized and thereby stores the information bit transferred from shift register stage 1. In this connection, additional stages (not shown) may be operated to shift in response to pulses comprising either a binary or digital type of input.

In the arrangement of the shift register of FIG. 4, it is noted that only a photoconductor element and an incandescent lamp comprises each storing stage and each shift stage of the shift register stages 1 and 2. To shift a stored bit of information from, for example, the storage stage including lamp 40 and element 44 of shift register stage 1 to the storage stage including lamp 42 and element 46 of shift register stage 2, it is required that photoconductor element 45 be irradiated by light energy emitted from lamp 40 as limited by optical coupling means 35, while lamp 41, when energized, shifts the stored bit of information to the shift register stage 2 by irradiating element 46 by emitted light energy irradiated in the direction of arrow 57. In this connection, the lamps and elements must be closely positioned so that light energy emitted from a given lamp may irradiate the element for its associated stage and the element of the succeeding stage.

Figures 5, 6, 7, 8, 9:
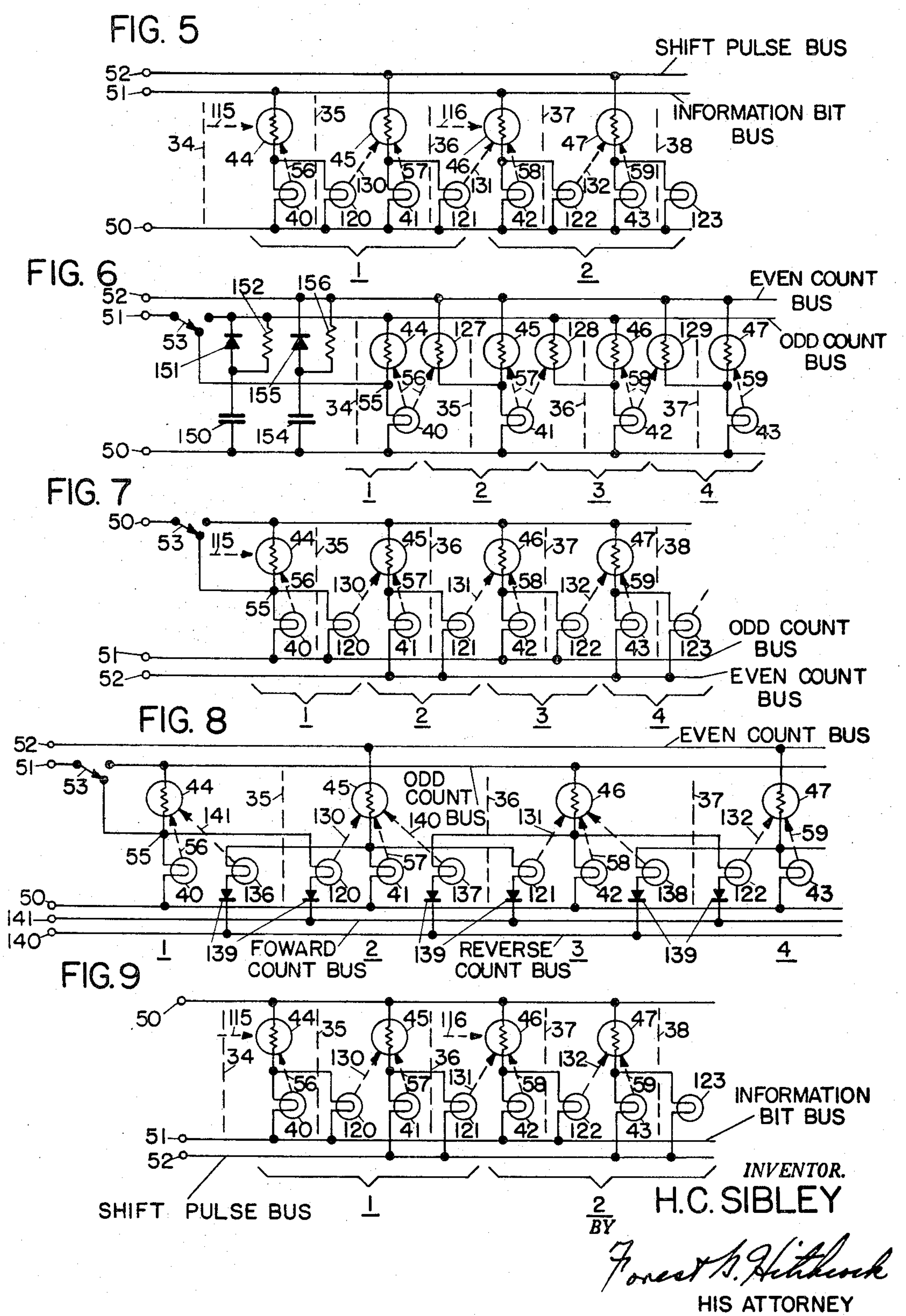
FIG. 5 is a schematic circuit diagram showing a shift register having remote visual read-out embodying this invention.
FIG. 6 is a schematic circuit diagram showing a counter having remote electrical read-out and further illustrating means for accomplishing a method of storage transfer disclosed herein.
FIG. 7 is a schematic circuit diagram showing a counter having remote visual read-out embodying this invention.
FIG. 8 is a schematic circuit diagram showing a reversible counter employing the principles of this invention.
FIG. 9 is a schematic circuit diagram showing another form of the shift register shown in FIG. 5 and embodying this invention.

In FIG. 5, the counting stages 1–4 of the counter shown in FIG. 2 are arranged in the form of shift register stages 1 and 2, but each such counting stage also includes an additional lamp electrically connected in shunt with the lamp of that stage. More particularly, lamps 40–43 have connected in shunt therewith respective lamps 120, 121, 122 and 123. It is noted that one terminal of each of the lamps 120–123 is connected to a common bus connected to input terminal 50. In addition, the two lamps included with a given stage are separated by optical coupling means to the extent that only one lamp irradiates the photoconductor element for that stage, while the other lamp irradiates the photoconductor element for the succeeding stage. For example, lamp 40 irradiates element 44, while lamp 120 in that stage irradiates photoconductor element 45 of the succeeding stage. In this respect, the stages may be located somewhat remote from each other while still providing transfer of bit information by visual readout from one stage to the next storage stage.

In the shift register stages 1 and 2, it is assumed that the oddly positioned stages including respective lamps 40, 120, 42 and 122 are employed to store bits of information appearing in the form of light energy as suggested by dotted arrows 115 and 116 respectively irradiating elements 44 and 46. The evenly positioned stages including lamps 41, 121, 43 and 123 are employed as shift stages. It is to be understood, however, that the oddly positioned stages could as well be used for shifting, while the evenly positioned stages could be used as bit storage stages.

In operation, one steady source of energy is applied to terminal 50 by a form of input means, while an information bit pulse is applied to terminal 51 and the INFORMATION BIT BUS for causing energization of the lamps associated with the bit storage stages having their respective photoconductor elements irradiated by input light energy. For example, assuming input light energy irradiates photoconductor element 44, and with opposite energies applied to terminals 50 and 51, lamps 40 and 120 are energized in that the resistance of element 44 is reduced by the input light energy. In response to a shift pulse applied to terminal 52 and the SHIFT PULSE BUS, lamps 41 and 121 are energized in that element 45 is in its low resistance condition. In this connection, the information bit pulse is removed from terminal 51 at the start of the pulse applied to terminal 52 so that element 44 again assumes its high resistance condition.

With lamp 121 now energized, the bit stored is shifted from shift register stage 1 to the storage stage of shift register stage 2 in that element 46 is irradiated by lamp 121. At the conclusion of the shift pulse applied to terminal 52, the circuit for energizing lamp 121 is disconnected. Lamp 121 continues to iradiate element 46 for a time interval according to the delay in illumination decay of such lamp 121. However, at the conclusion of the shift pulse applied to terminal 52, an information bit pulse is applied to terminal 51 so that lamps 42 and 122 included with the bit storage stage of the shift register stage 2 are energized. Lamp 42 then energized irradiates element 46 to cause it to assume its low resistance condition thereby completing the energizing circuit for lamps 42 and 122. Lamp 122 as energized irradiates element 47 of the shift stage for shift register stage 2.

In FIG. 6, the counting stages 1–4 shown in the counter of FIG. 2 are again arranged as a counter, but the stages 2–4 include, respectively, additional photoconductor elements 127, 128 and 129. Each of such elements 127–129 is associated with the lamp of the previous counting stage in that that lamp irradiates the photoconductor element so that counting between the counting stages can occur even though the stages may be remotely located one from the other.

In operation, an energy source of one polarity is applied to terminal 50 and to one terminal of each of the lamps 40–43 included with the counting stages 1–4 respectively. Operation of counting stage 1 occurs when energy applied to terminal 51 of the opposite polarity is connected to the common point of connection 44 to energize lamp 40. With switch 53 switched to its opposite position, lamp 40 remains energized in that a circuit is completed through element 44 now in its low resistance condition as caused by emitted light energy irradiated in the direction of arrow 56.

Light energy irradiated in the direction of arrows 56 also irradiates photoconductor element 127 of counting stage 2 during energization of such lamp 40. In response to the next input counting pulse applied to terminal 52 and the EVEN COUNT BUS, lamp 41 of counting stage 2 is energized and emits light energy in the direction of arrows 57. Element 45 is irradiated by the light energy from lamp 41 and assumes its low resistance condition to maintain the circuit completed for energizing lamp 41. However, lamp 40 is subsequently deenergized according to its delay in illumination decay to cause the light energy to be removed from element 127. Element 127 then returns to a high resistance condition in that it is not being irradiated by light energy. In response to successive pulses of pulse train applied to terminals 51 and 52 alternately, the counter of FIG. 6 is effective to cause successive counting stages 3 and 4 to be operated for displaying the count corresponding to the highest numbered pulse received from a given train of pulses.

In FIG. 7, a counter is shown including counting stages 1–4. In this embodiment, however, each of the counting stages 1–4 includes an extra incandescent lamp for permitting remote positioning and read-out of the individual counting stages 1–4 where such extra incandescent lamp is used for transfer of storage. As an alternate arrangement, it is suggested that the counting stages may be adjacently positioned, while yet including the extra lamp for transfer of storage, but including still an additional lamp for each of the counting stages 1–4 which may be used for remote read-out for giving an indication of the existing count position of the counter of FIG. 7. In particular, the lamps 120, 121, 122 and 123 are connected in shunt with lamps 40, 41, 42 and 43, respectively. It is noted that the optical coupling means 35, 36 and 37 are employed to optically separate the counting stages 1–4 such that respective lamps 120, 121 and 122 irradiate the photoconductor elements 45, 46 and 47 of respective counting stages 2, 3 and 4.

In operation, an energizing circuit may be completed for lamps 40 and 120 of counting stage 1 by applying opposite energies to the terminal 50 and 51 so that photoconductor element 44 is electrically shunted where switch 53 connects terminal 50 to connection 55. Alternately, light energy may be supplied from an input source to irradiate element 44 in the direction of arrow 115 to cause it to assume a low resistance condition to thereby complete an energizing circuit for the lamps 40 and 120. The pulsed energy applied to terminal 51 and the ODD COUNT BUS represents the first pulse of a first pulse train. A second train of pulses is applied to terminal 52 having pulses appearing alternately in time sequence to the pulses of the first pulse train applied to terminal 51. Thus, the first pulse applied to terminal 52 causes the circuit to be completed for energizing lamps 41 and 121 in that element 45 is irradiated by lamp 120 in the direction of arrow 130 even though energy is removed from terminal 51. With lamp 121 energized, element 46 for counting stage 3 is irradiated by light energy emitted in the direction of arrow 131 so that it assumes its low resistance condition. The second pulse of the pulse train applied to terminal 51 then completes a circuit for energizing lamps 42 and 122, while lamps 41 and 121 are deenergized in that element 45 again assumes its high resistance condition in the absence of pulsed energy at terminal 52. With lamp 122 energized, light energy emitted in the direction of arrow 132 causes element 47 to assume its low resistance condition. The second pulse of the second train of pulses applied to terminal 52 then completes an energizing circuit for lamps 43 and 123 for energizing such lamps. Element 47 is thus irradiated by light energy in the direction of arrow 59 from lamp 43 to store the count representing count No. 4. Succeeding counting stages (not shown) are additionally controlled in sequence as the first and second trains of pulses are applied respectively and alternately to the input terminals 51 and 52.

In FIG. 8, photoconductor elements and incandescent lamps are arranged in the form of a reversible counter. Counting stage 1 includes element 44 and lamps 40 and 120. Counting stage 2 includes element 45 and lamps 41, 121 and 136. Counting stage 3 includes element 46 and lamps 42, 122 and 137. Counting stage 4 includes element 47 and lamps 43 and 138. One lamp for each of the counting stages 2–4 are connected to the REVERSE COUNT BUS and terminal 140, these lamps being respectively 136, 137 and 138. Lamps 120, 121 and 122 for counting stages 1–3 are connected to the FORWARD COUNT BUS and input terminal 141.

Each of the lamps 120–122 and 136–138 is connected to its respective FORWARD COUNT BUSES or REVERSE COUNT BUS through a diode 139 as shown in FIG. 8. The purpose of including diodes 139 is to prevent feed-around circuits during the counting operation. In this respect it is noted that the diodes 139 are connected such that a negative (−) energy is required to be applied to terminals 140 and 141 in order to effect a counting operation. It is suggested here that the diodes 139 could be connected so that a positive (+) energy could be connected to terminals 140 and 141 for a counting operation, if desired.

The optical coupling means 35, 36 and 37 separating the respective counting stages 1–4 are positioned so that a lamp for each counting stage 2–4 is positioned so that it may be optically coupled to the photoconductor element for the counting stages on opposite sides thereof and optically shielded from the photoconductor element of its stage. For example, lamp 136 included with counting stage 2, when energized, irradiates element 44 included with counting stage 1, while lamp 121 also included with counting stage 2, when energized, irradiates element 46 of the counting stage 3.

In operation, with first and second trains of pulses applied to the input terminals 51 and 52 and the ODD COUNT BUS and EVEN COUNT BUS, respectively, the counting stages 1–4 count in sequence in a forward count direction as long as steady energy of the proper polarity is connected to terminal 141 and the FORWARD COUNT BUS so as to sequentially energize lamps 120, 121 and 122 for transferring pulse counts between respective counting stages 1–4. Moreover, if steady energy is applied to the REVERSE COUNT BUS at input terminal 140 instead of the FORWARD COUNT BUS at terminal 141, the respective lamps 136, 137 and 138 are energized in sequence in response to input energy pulses at terminals 51 and 52 according to the counting position wherein the reverse counting is initiated.

To count in a forward count direction, for example, buses 50 and 141 are supplied with a similar source of steady energy while trains of counting pulses are applied to terminals 51 and 52 where such pulses alternate in time sequence. In this respect, a first pulse applied to terminal 51, and assuming switch 53 is electrically connected to the common point of connection 55, causes lamp 40 to be energized which irradiates element 44. When switch 53 is moved to its other position, energy flows through lamps 40 and 120 through the element 44. Element 120 as so energized irradiates element 45 of counting stage 2 so that it assumes its low resistance condition. In response to a first pulse applied to terminal 52 and the EVEN COUNT BUS, circuits are completed for energizing lamps 41 and 121 included with counting stage 2 to the respective terminals 50 and 141. Similarly, the counting stages 3 and 4 are operated in a forward sequence according to successive pulses applied to the terminal 51 and 52 respectively.

To operate the reversible counter in a reverse counting direction, a source of energy having the polarity similar to that applied to terminal 50 is applied to terminal 140, while no energy is applied to terminal 141. Assuming that the counting stage 3 is now operated, and with pulsed energy applied to terminal 51, lamps 42 and 137 for counting stage 3 are energized. The next pulse of energy applied to terminal 52 and the EVEN COUNT BUS energizes the counting stage 2 in that element 45 is in its low resistance condition responsive to the light energy emitted from lamp 137 in the direction of arrow 140. Thus, lamps 41 and 136 included with counting stage 2 are energized through the element 45 and included respective terminals 52, 50 and 140. The next pulse applied to terminal 51 then energizes counting stage 1 in that element 44 is in its low resistance condition responsive to light energy emitted from lamp 136 in the direction of arrow 141. Incandescent lamp 40 then has its energizing circuit completed through the element 44 and includes respective terminals 50 and 51.

Referring now to FIG. 9, a shift register is shown similar to the shift register shown in FIG. 5. However, it is noted in the shift register of FIG. 9 that similar terminals of the photoconductor elements 44–47 are connected to terminal 50 to which is connected a steady source of energy. The bit storage stages of the shift register stages 1 and 2 which include, respectively, lamps 40 and 120 and lamps 42 and 122 are connected to the INFORMATION BIT BUS and terminal 51, while the shift stages of the shift register stages 1 and 2 including, respectively, lamps 41 and 121 and lamps 123 are connected to the SHIFT PULSE BUS and terminal 52.

In operation, the storage bit stages of shift register stages 1 and 2 may respectively receive bit information in a form of light energy provided by an external light source and directed onto respective elements 44 and 46 in the direction of arrows 115 and 116 as described above. In this respect, the input light energy may appear simultaneously or separately at different times as required by the particular type of information input such as digital or binary. If, for example, it is assumed that element 44 is in its low resistance condition responsive to input light energy, a circuit is completed for respective lamps 40 and 120 through element 44 and includes terminals 50 and 51 having input opposite energies applied thereto. A first input shift pulse applied to terminal 52 and the SHIFT PULSE BUS causes the stored bit of information for the shift register stage 1 to be shifted to the storage stage of the shift register stage 2 in that lamps 41 and 121 of the shift stage are energized responsive to the presence of the shift pulse which causes element 46 to be in its low resistance condition responsive to light energy emitted from lamp 121. Assuming that pulsed energy is applied to terminal 51, circuits are completed for energizing lamps 42 and 122 of the storage stage for the shift register stage 2 through element 46. In this respect, it is assumed that the shift pulse is concluded as the information bit pulse is initiated at respective terminals 52 and 51.

In the above description provided for the different embodiments of FIGS. 2–9, it is suggested that pulses of energy be applied to the various input terminals such as input terminals 51 and 52 to effect operation of the counter or shift register. It is further suggested here that the length of such pulses may be variable so as to cause the given counter or shift register to remain in an existing position for any desired length of time. In this respect, the applied pulse, being positive or negative in character, would be at a steady level for the entire duration of pulse application.

The method of transferring a condition of storage between successively positioned stages and storage elements in the embodiments described above include the steps of applying a given source of energy to like terminals of successively positioned storage stages such as connected to terminal 50 and alternately applying an opposite source of energy to separate terminals of oddly and evenly positioned stages of the storage elements subject to at least concurrent removal of the opposite source of energy from those stages to which such energy was last applied such as the pulsed energy applied to terminals 51 and 52 as described above. In each instance, transfer is effected between successive stages due to the delay in thermal decay of the incandescent lamp for the then energized stage such that a time interval exists between the conclusion of application of an energy pulse to either terminal and the initial application of a second pulse to the opposite terminal. The photoconductor element for the successive stage is in its low resistance condition and remains therein at least during the time interval elapsing between energy removal from given stages and energy application to other given stages of the storage elements.

The above described method of transferring a condition of storage is dependent upon the delay in decay of the light energy emitted from a given incandescent lamp after removal of controlling energy thus providing a time interval between removal of control energy and application of succeeding control energy which is limited by the delay in decay of a given incandescent lamp.

An alternate method of transferring a condition of storage between successively positioned stages and storage elements in the embodiments described above provides for having a time interval between control energy application and initiation of control energy application that is variable, as desired. In particular, this alternate method includes a means for maintaining a given incandescent lamp energized and associated elements in their low resistance conditions after removal of control energy and until control energy is again applied.

The means for effecting the alternate method of storage transfer is particularly shown with the counter of FIG. 6, but it is here suggested that such means may be employed with any of the other counters or shift registers described to lengthen the time interval mentioned. Referring particularly to FIG. 6, a capacitor storage stage is connected between the terminal 51 and each of the terminals 51 and 52. Between terminals 50 and 51, capacitor 150 is connected through a diode 151 and resistor 152. Between terminals 50 and 52, capacitor 154 is connected though a diode 155 and a resistor 156.

In operation, a positive (+) energy pulse applied to either terminal 51 or 52 charges the respective capacitor 150 or 154 through its respective resistor 152 or 156 so that upon removal of the positive (+) energy pulse and before application of a positive (+) energy pulse to the opposite terminal, the respective capacitor 150 or 154 discharged through its respective diode 151 or 155 and through the then energized storage circuit for maintaining the particular lamp energized and respective associated elements in their low resistance conditions. For example, if it is assumed that the counting stage 1 of FIG. 6 is initially energized as described above, lamp 40 emits light energy to cause elements 44 and 127 to be in their low resistance conditions. Also, capacitor 150 is charged through resistor 152 between the terminals 50 and 51. Upon removal of energy from terminal 51, capacitor 150 discharges through diode 151 and through the element 44 and lamp 40 to terminal 50 causing lamp 40 to remain energized for a time interval according to the discharge of capacitor 150. During such time interval, light energy emitted in the direction of arrows 56 causes the elements 44 and 127 to remain in their low resistance conditions. Before capacitor 150 discharges to the extent that lamp 40 is rendered ineffective to maintain elements 44 and 127 in their low resistance conditions, a positive (+) energy pulse is applied to terminal 52 which causes a circuit to be completed for energizing lamp 41 of counting stage 2 through the element 127. During this same time, capacitor 154 is charged through resistor 156, and this capacitor 154 discharged through diode 155 and element 45 then in its low resistance condition to maintain lamp 41 energized at least until a succeeding pulse is applied to terminal 51.

The respective diodes 151 and 155 may be connected electrically opposite in position so that negative pulses may be applied to terminals 51 and 52 with a positive source of energy being connected to terminal 50. In addition, it is suggested that alternating currents could as well be employed in the above examples where it is not desired to employ capacitors 150 and 154.

Having described a method and systems for handling information, as specific embodiments of the present invention, it is desired to be understood that these forms are selected to facilitate in the disclosure of the invention rather than to limit the number of forms which it may assume; and, it is to be further understood that various other modifications, adaptations and alternations may be applied to the specific forms shown to meet the requirements of practice, without in any manner departing from the spirit or scope of the present invention.

What I claim is:

1. An information handling system comprising a plurality of storage units, each storage unit comprising a light emitting element and a light receiving element connected electrically in series and having an electrically common point of connection and said light receiving element being situated to receive light energy from the light emitting element, each said light receiving element normally having a substantially high resistance but reducible to a low resistance in response to received light energy, means for electrically connecting each series combination of light emitting element and light receiving element to opposite terminals of an energy source, input means having two selective positions, one position when selected for connecting one terminal of the energy source to the common point of connection of a selected storage unit and the other position when selected for connecting the other terminal of the energy source to the common point of connection of said selected storage unit, said one position for maintaining energized said light emitting element of the selected storage unit and said other position for maintaining deenergized said light emitting element of the selected storage unit, and switching means interconnecting said input means and said plurality of storage units effective when controlled to select a storage unit for operation.

2. The system according to claim 1 wherein said light emitting element is an incandescent lamp.

3. The system according to claim 1 wherein said light receiving element is a photoconductor element.

4. An information handling system comprising a plurality of storage units, each storage unit comprising a light emitting element and a light receiving element connected electrically in series and having an electrically common point of connection and said light receiving element being situated to receive light energy from the light emitting element, each said light receiving element normally having a substantially high resistance but reducible to a low resistance in response to receive light energy, means for electrically connecting each series combination of light emitting element and light receiving element to opposite terminals of an energy source, input means operative to connect one terminal of the energy source and the other terminal of the energy source in a given sequence to the common point of connection of a selected storage unit, whereby to maintain the energization and the deenergization of the light emitting element thereof, and switching means interconnecting said input means and said plurality of storage units for determining the sequence of connection thereof.

5. The system according to claim 4 wherein said switching means includes a plurality of relays adapted to be energized and deenergized in a given sequence and means for determining the particular sequence of energization and deenergization of the plurality of relays, each said relay having a closed front contact and a closed back contact dependent upon the energization or deenergization thereof, the closed front contact of a given relay being effective to complete a circuit interconnecting said input means and an associated storage unit dependent upon given closed back contacts for other given relays.

6. The system according to claim 5 wherein said input means includes a resistive element placed in the circuit connecting said energy source to the common point of connection of a selected storage unit, whereby current caused to flow through the light receiving element of a selected storage unit is limited to a value with the current carrying limit of that light receiving element.

7. An information handling system comprising a plurality of counting stages, each of said plurality of counting stages including a light emitting element and a light receiving element connected electrically in series, said light receiving element normally having a substantially high resistance but reducible to a low resistance in response to received light energy, coupling means positioned relative to said plurality of stages for optically coupling light energy from each said light emitting element to irradiate only the light receiving elements of the corresponding stage and the succeeding stage, means for electrically connecting one element of each of said plurality of stages to one terminal of an energy source while selectively connecting electrically at times the other elements for evenly positioned stages to the other terminal of the energy source and at other times the other elements for oddly positioned stages to the other terminal of the energy source, and input means for causing the light emitting element of the first stage included with the oddly positioned stages to be energized, whereby selective connection in sequence of the other elements corresponding to the oddly and evenly positioned stages to the other terminal of the energy source causes the light emitting element corresponding to the stage then having its light receiving element irradiated to be energized.

8. The system according to claim 7 wherein all of the light emitting elements of said plurality of counting stages are electrically connected to said one terminal of the energy source and the light receiving elements corresponding to the oddly positioned stages are electrically connnected at said times to the other terminals of the energy source and the light receiving elements corresponding to the evenly positioned stages are electrically connected at said other times to the other terminal of the energy source.

9. The system according to claim 7 wherein all of the light receiving elements of said plurality of counting stages are electrically connected to said one terminal of the energy source and the light emitting elements corresponding to the oddly positioned stages are electrically connected at said times to the other terminal of the energy source and the light emitting elements corresponding to the evenly positioned stages are electrically connected at said other times to the other terminal of the energy source.

10. The system according to claim 7 wherein each said light emitting element is an incandescent lamp and each said light receiving element is a photoconductor.

11. The system according to claim 7 wherein said means includes switching means having two selective positions, one position for electrically connecting the other elements for oddly positioned stages to the other terminal of the energy source, the other position for connecting said other energy source to an electrically common point of connection between the light emitting element and the light receiving element comprising the first counting stage of said plurality of counting stages, whereby said light emitting element included with the first counting stage is energized while all other light emitting elements are deenergized.

12. An information handling system comprising a plurality of stages, each of said plurality of stages including a light emitting element and a light receiving element connected electrically in series, said light receiving element normally having a substantially high resistance but reducible to a low resistance in response to received light energy, coupling means positioned relative to said plurality of stages for optically coupling emitted light energy from each said light emitting element to irradiate only the light receiving elements of the corresponding stage and the succeeding stage, means for electrically connecting one element of each stage of said plurality to one terminal of an energy source while electrically connecting the other elements included with first alternate stages of said plurality to the other terminal of the energy source, light radiation input means selectively effective to irradiate at least one of said light receiving elements corresponding to a selected stage of the first alternate stages causing that light receiving element to assume a low resistance condition for energizing the light emitting element of that stage, and input means operative to electrically connect momentarily the other elements included with second alternate stages of said plurality to the other terminal of the energy source, whereby all light emitting elements corresponding to the stages of said second alternate stages of said plurality having their respective light receiving elements irradiated by the light emitting element of the preceding stage included with said first alternate stages therein energized are energized and irradiate a successive light receiving element corresponding to a stage of said first alternate stages thereby causing energization of the light receiving element of that stage.

13. The system according to claim 12 wherein the first alternate stages of said plurality are evenly positioned stages and the second alternate stages of said plurality are oddly positioned stages.

14. The system according to claim 12 wherein the first alternate stages of said plurality are oddly positioned stages and the second alternate stages of said plurality are evenly positioned stages.

15. An information handling system comprising a plurality of stages, each of said plurality of stages comprising at least two light emitting elements electrically connected in shunt and a light receiving element electrically connected in series with the shunt connected light emitting element, said light receiving element normally having a substantially high resistance but reducible to a low resistance in response to received light energy, coupling means positioned relative to said plurality of stages for causing light energy emitted from one light emitting element of a stage to irradiate the light receiving element of that stage while causing the second light emitting element of that stage to irradiate the light receiving element of the succeeding stage, means for electrically connecting the light emitting elements for all of said plurality of stages to one terminal of an energy source while electrically connecting the light receiving elements included with first alternate stages of said plurality to the other terminal of the energy source, input radiation means selectively effective to irradiate at least one of said light receiving elements corresponding to a selected stage of said first alternate stages causing that light receiving element to assume its low resistance condition for energizing the light emitting elements for that stage, and input means operative to electrically connect for a limited time interval the light receiving elements included with second alternate stages of said plurality to the other terminal of the energy source, whereby said one light emitting element and said second light emitting element corresponding to respective ones of the second alternate stages having the light receiving elements thereof irradiated are energized, said second light emitting element when energized effective to irradiate the light receiving element for the successive first alternate stage to thereby cause the light emitting element therefor to be energized.

16. The system according to claim 15 wherein said first alternate stages of said plurality are evenly positioned stages and said second alternate stages of said plurality are oddly positioned stages.

17. The system according to claim 15 wherein said first alternate stages of said plurality are oddly positioned stages and said second alternate stages of said plurality are evenly positioned stages.

18. The system according to claim 15 wherein the second light emitting element of a given stage is positioned remotely from that stage but in optical proximity to the light receiving element of the succeeding stage.

19. An information handling system comprising a plurality of stages, each of said plurality of stages comprising at least two light emitting elements electrically connected in shunt and a light receiving element electrically connected in series therewith, said light receiving element normally having a substantially high resistance but reducible to a low resistance in response to received light energy, coupling means positioned relative to said plurality of stages for optically coupling light energy emitted from one light emitting element of a stage to the light receiving elements of that stage and the succeeding stage, means for electrically connecting the light receiving element for all of said plurality of stages to one terminal of an energy source and electrically connecting said one light emitting element and said second light emitting element included with first alternate stages of said plurality to the other terminal of the energy source, input radiation means effective to irradiate at least one of said light receiving elements corresponding to a selected stage of said first alternate stages causing that light receiving element to assume its low resistance condition for energizing the light emitting elements for that stage, and input means operative to electrically connect for a limited time interval the light emitting elements included with second alternate stages of said plurality to the other terminal of the energy source, whereby said one light emitting element and said second light emitting element corresponding to respective ones of the second alternate stages having the light receiving element thereof irradiated are energized, said second light emitting element when energized being effective to irradiate the light receiving element for the successive first alternate stage to thereby cause the light emitting elements therefor to be energized.

20. An information handling system comprising a plurality of counting stages, each of said plurality of counting stages comprising at least three light emitting elements electrically connected in shunt and a light receiving element electrically connected in series therewith, each said light receiving element normally having a substantially high resistance but reducible to a low resistance in response to received light energy, coupling means positioned relative to said plurality of counting stages for causing light energy emitting from one light emitting element of a given stage to irradiate the light receiving element of that stage only while causing light energy emitting from a second light emitting element of that stage to irradiate the light receiving element of the prior stage only and causing light energy emitting from a third light emitting element of a third light emitting element of that stage to irradiate the light receiving element of the succeeding stage, means for electrically connecting all of the one light emitting elements of said plurality of counting stages to an energy source of one polarity constantly and selectively connecting electrically at one time all of the second light emitting elements and at another time all of the second light emitting elements and at another time all of the third light emitting elements of said plurality of counting stages to said energy source of one polarity input pulsing means effective to apply a first train of counting pulses of an energy source of opposite polarity to the light receiving elements of first alternate counter stages and a second train of pulses of an energy source of opposite polarity to the light receiving elements of second alternate counting stages.

21. The system according to claim 20 wherein said input pulsing means includes an input radiation means effective to direct light energy onto the light receiving element of the first counting stage, said plurality of counting stages being operated in succession in response to said first train of pulses and said second train of pulses when applied and in a direction corresponding to the connection of the one source of energy to either said second light emitting elements or said third light emitting elements of the plurality of counting stages.

22. The system according to claim 21 wherein connection of the third light emitting element to said one source of energy causes successive forward counting in response to received pulses of said first train of pulses and said second train of pulses, the connection of the second light emitting elements to said one source of energy causes successive reverse counting in response to received pulses of said first train of pulses and said second train of pulses.

References Cited

UNITED STATES PATENTS

| | | | |
|---|---|---|---|
| 2,893,632 | 7/1959 | Allen et al. | 235—92 |
| 3,087,067 | 4/1963 | Nisbet et al. | 250—209 |
| 3,134,015 | 5/1964 | Harrison | 235—92 |
| 3,160,756 | 12/1964 | Marko | 250—209 |
| 3,175,090 | 3/1965 | Ries et al. | 250—213 |
| 3,191,043 | 6/1965 | Wilmotte | 250—209 |
| 3,202,823 | 8/1965 | Rice et al. | 250—209 |
| 3,222,527 | 12/1965 | Low et al. | 250—209 |
| 3,222,528 | 12/1965 | Thorpe | 250—209 |
| 3,226,553 | 12/1965 | Terlet | 250—209 |

WALTER STOLWEIN, *Primary Examiner.*